US012711931B2

(12) United States Patent
Heo et al.

(10) Patent No.: US 12,711,931 B2
(45) Date of Patent: Aug. 18, 2026

(54) DISPLAY DEVICE AND VISIBILITY IMPROVEMENT METHOD OF IMAGE THEREFOR

(71) Applicant: LX SEMICON CO., LTD., Daejeon (KR)

(72) Inventors: Jun Ho Heo, Daejeon (KR); Yong Hee Kim, Daejeon (KR); Byung Cheol Song, Daejeon (KR); Seung Wan Yu, Daejeon (KR); Seung Hyun Lee, Daejeon (KR); Jun Min Lee, Daejeon (KR); Ji Won Lee, Daejeon (KR); Hee Jin Lee, Daejeon (KR); Se Ha Jeong, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 119 days.

(21) Appl. No.: 18/431,074

(22) Filed: Feb. 2, 2024

(65) Prior Publication Data

US 2024/0274102 A1 Aug. 15, 2024

(30) Foreign Application Priority Data

Feb. 15, 2023 (KR) ........................ 10-2023-0019890

(51) Int. Cl.
*G09G 5/30* (2006.01)
*G09G 5/10* (2006.01)

(52) U.S. Cl.
CPC ................. *G09G 5/30* (2013.01); *G09G 5/10* (2013.01); *G09G 2320/0233* (2013.01); *G09G 2320/0626* (2013.01); *G09G 2320/066* (2013.01); *G09G 2360/16* (2013.01)

(58) Field of Classification Search
CPC ............. G09G 5/10; G09G 2320/0233; G09G 2320/0626; G09G 2320/066; G09G 2360/144; G06T 5/94
See application file for complete search history.

(56) References Cited

U.S. PATENT DOCUMENTS

| | | | | |
|---|---|---|---|---|
| 2008/0055228 | A1 | 3/2008 | Glen | |
| 2016/0314762 | A1 | 10/2016 | Lee et al. | |
| 2019/0371268 | A1 | 12/2019 | Lee et al. | |
| 2023/0042639 | A1 | 2/2023 | Goodsitt et al. | |
| 2024/0273693 | A1 * | 8/2024 | Heo | G06T 5/92 |

OTHER PUBLICATIONS

Extended European Search Report dated Jun. 11, 2024, issued for the corresponding European patent application No. 23220235.8, 24 pages.

* cited by examiner

*Primary Examiner* — Antonio A Caschera
(74) *Attorney, Agent, or Firm* — ROTHWELL, FIGG, ERNST & MANBECK, P.C.

(57) ABSTRACT

The present disclosure discloses a display device for improving visibility of an image and a visibility improvement method of an image therefor, and the display device implements global compensation and local compensation adaptively to content displayed in the image, thereby improving the visibility of the image.

17 Claims, 12 Drawing Sheets

DISPLAY DEVICE AND VISIBILITY IMPROVEMENT METHOD OF IMAGE THEREFOR

CROSS-REFERENCE TO RELATED APPLICATIONS

The present application claims the benefits of priority to Korean Patent Application No. 10-2023-0019890, filed on Feb. 15, 2023, the entire contents of which are hereby expressly incorporated by reference into the present application in their entirety.

BACKGROUND

1. Technical Field

Various embodiments generally relate to a technology for improving visibility of an image, and more particularly, to a display device for improving visibility of an image and a visibility improvement method of an image therefor.

2. Related Art

A display panel may display an image by combining luminance information and color information.

The image of the display panel may have different levels of visibility depending on the brightness of each area. Illustratively, a bright area, a medium brightness area, and a dark area may have different visibility. The visibility of the bright and dark areas may be poor compared to the medium brightness area.

In general, in order to improve visibility, a method of extracting luminance information of an image and compensating for the extracted luminance information in consideration of a relationship with ambient illumination may be considered. Also, a method of compensating for luminance information of an image according to whether luminance information of the image exceeds a preset threshold may be considered.

SUMMARY

The general visibility improvement technology described above uses very simple image luminance characteristics and the technology cannot be effectively compensated locally. Therefore, the general visibility improvement technology has limitations in solving a visibility problem caused by complex factors, and there is a problem in not suggesting an effective solution for local compensation.

For example, when an image is dark, most pixel values of the original image may be concentrated near low gray levels. A global compensation may generally improve visibility by increasing the overall brightness of an image, and the degree of compensation may be relatively large because of the many dark areas. However, as the global compensation graph increases significantly, contrast deterioration occurs in high grayscale areas.

By contrast, when an image is dark, most pixel values of the original image may be concentrated near high gray levels. A global compensation may generally improve visibility by increasing the overall brightness of the image, and the degree of compensation may be relatively small because there are already many bright areas. However, because the global compensation is relatively small, there may be insufficient visibility improvement in low gray areas.

Therefore, it is difficult to display a high-quality image through a display panel due to the above problems and it is necessary to develop a technology capable of improving visibility of an image.

Embodiments of the present disclosure adaptively improve visibility of an image based not only on brightness information but also on the type, or class, of the image. In some embodiments, the class of the image may be used to determine an optimal global compensation calculation based on a relationship between ambient luminance and the class of the content.

Moreover, global image compensation may cause visibility loss in a detailed regional area of an image. According to some embodiments, a degree of compensation for regional parts of an image may be controlled depending on the brightness of the image, and a blending method may be used to simultaneously improve global and regional visibility of an image and prevent artifacts.

According to one aspect, a display device is provided. The display device includes processing circuitry and a memory coupled to the processing circuitry. The processing circuitry is configured to obtain input frame data corresponding to an image. The processing circuitry is configured to classify content represented in the image as a first class out of a plurality of classes. The processing circuitry is configured to obtain image brightness level information of the input frame data. The processing circuitry is configured to obtain an illuminance signal for the image. The processing circuitry is configured to generate global compensation information based on the input frame data, the first class, the image brightness level information, and the illuminance signal. The processing circuitry is configured to identify a plurality of unit areas of the image. The processing circuitry is configured to generate local compensation information for each unit area of the plurality of unit areas. The processing circuitry is configured to generate output frame data based on blending the global compensation information and the local compensation information. The processing circuitry is configured to output the generated output frame data to a display.

In some embodiments, the processing circuitry is further configured to generate the image brightness level information of the input frame data.

In some embodiments, the processing circuitry is further configured to store class information of the plurality of classes on pre-classified content; and classify the content represented in the image as a first class out of the plurality of classes based on the stored class information.

In some embodiments, the processing circuitry is further configured to calculate average brightness of the input frame data, wherein the obtained image brightness level information is the calculated result.

In some embodiments, the processing circuitry is further configured to: store a plurality of pieces of global compensation graph data; select one or more pieces of global compensation graph data corresponding to the illuminance signal, the first class, and the image brightness level information; generate a global compensation graph corresponding to the selected one or more pieces of global compensation graph data; and output the global compensation information by calculating the input frame data using the global compensation graph. In some the global compensation graph data comprises a brightness value table and a saturation table, and wherein the brightness value table and the saturation table are set to have values corresponding to a plurality of preset levels among luminance ranges of the input frame data. In some embodiments, the global compensation graph corresponds to the brightness value table and the saturation table, and the processing circuitry is further configured to: convert a first brightness value and a first saturation of the input frame data into a second brightness value and a second saturation corresponding to the brightness value table and the saturation table; and output the global compensation information having values corresponding to the second brightness value and the second saturation.

In some embodiments, the processing circuitry is further configured to: generate visibility reduction modeling information for compensation of a preset high luminance area and a preset low luminance area of the global compensation information; and output the visibility reduction modeling information.

In some embodiments, the processing circuitry is further configured to: generate the local compensation information by performing the local compensation on the input frame data; and generate the output frame data by blending the global compensation information and the local compensation information. In some embodiments, the processing circuitry is further configured to: obtain a local contrast map in which a proportional relationship between visibility reduction modeling information and the input frame data is normalized; obtain a local contrast weighted map, wherein the local contrast weighted map is obtained by applying a weight corresponding to the image brightness level information to the local contrast map; and compensate a preset high luminance area and a preset low luminance area of the global compensation information based on the local contrast weighted map. In some embodiments, the weight is set by a weight calculation formula such that a larger brightness value is set to be smaller and a lower brightness value is set to be larger with respect to a preset range of the image brightness level information. In some embodiments, the processing circuitry is further configured to: convert the input frame data according to a blending calculation formula, wherein the blending calculation formula is based on the local compensation information, the local contrast weighted map, and the global compensation information.

According to another aspect, a method for improving visibility of an image for a display device is provided. The method includes obtaining input frame data corresponding to an image. The method includes classifying content represented in the image as a first class of a plurality of classes. The method includes calculating an image brightness level of the input frame data. The method includes obtaining an illuminance signal for the image. The method includes generating global compensation information based on the input frame data, the first class, the image brightness level information, and the illuminance signal. The method includes generating output frame data based on the global compensation information. The method includes outputting the generated output frame data to a display.

In some embodiments, the method further includes identifying a plurality of unit areas of the image; and generating local compensation information for each unit area of the plurality of unit areas, wherein the generating the output frame data comprises blending the local compensation information and the global compensation information. In some embodiments, the method further includes generating visibility reduction modeling information for compensating for a preset high luminance area and a preset low luminance area of the global compensation information; and outputting the visibility reduction modeling information, wherein the generating the output frame data comprises controlling the blending of the local compensation information and the global compensation information corresponding to the visibility reduction model and the image brightness level.

In some embodiments, the method further includes generating the local compensation information by performing the local compensation on the input frame data; and generating the output frame data by blending the global compensation information and the local compensation information. In some embodiments, the method further comprises obtaining a local contrast map in which a proportional relationship between visibility reduction modeling information and the input frame data is normalized; obtaining a local contrast weighted map, wherein the local contrast weighted map is obtained by applying a weight corresponding to the image brightness level information to the local contrast map; and compensating a preset high luminance area and a preset low luminance area of the global compensation information based on the local contrast weighted map. In some embodiments, the weight is set by a weight calculation formula such that a larger brightness value is set to be smaller and a lower brightness value is set to be larger with respect to a preset range of the image brightness level information. In some embodiments, the method further includes converting the input frame data according to a blending calculation formula, wherein the blending calculation formula is based on the local compensation information, the local contrast weighted map, and the global compensation information.

According to another aspect, a computer program product comprising a non-transitory computer readable medium storing computer readable instructions is provided. When executed by processing circuitry, the computer readable instructions cause the processing circuitry to: obtain input frame data corresponding to an image; classify content represented in the image as a first class out of a plurality of classes; obtain image brightness level information of the input frame data; obtain an illuminance signal for the image; generate global compensation information based on the input frame data, the first class, the image brightness level information, and the illuminance signal; identify a plurality of unit areas of the image; generate local compensation information for each unit area of the plurality of unit areas; generate output frame data based on blending the global compensation information and the local compensation information; and output the generated output frame data to a display.

DETAILED DESCRIPTION

Various embodiments are directed to a display device capable of improving visibility of an image and a visibility improvement method of an image therefor.

Also, various embodiments are directed to a display device capable of improving visibility of an image through global compensation and local compensation for the image, and a visibility improvement method of an image therefor.

Further, various embodiments are directed to a display device capable of improving visibility by implementing global compensation adaptive to content displayed in an image, and a visibility improvement method of an image therefor.

In addition, various embodiments are directed to a display device capable of improving visibility according to local compensation by reflecting a result of global compensation adaptive to content displayed in an image to the local compensation, and a visibility improvement method of an image therefor.

According to the embodiments of the present disclosure, it is possible to improve visibility adaptively to content displayed on an image.

Also, according to the embodiments of the present disclosure, it is possible to provide optimal visibility corresponding to content of an image and ambient illumination, and provide improved visibility according to global compensation and local compensation by reflecting content characteristics to both the global compensation and local compensation.

Further, according to the embodiments of the present disclosure, it is possible to provide improved visibility according to local compensation by reflecting a result of global compensation adaptive to content displayed in an image to local compensation.

In addition, according to the embodiments of the present disclosure, it is possible to provide a high-quality image by improving visibility as described above.

A display device of the present disclosure may be implemented to display an image on a display panel by providing display data.

Illustratively, in a general display system displaying an image, display data may be provided from a timing controller to a driver integrated circuit, and the driver integrated circuit may provide driving signals corresponding to the display data to the display panel and the display panel may display an image in response to the driving signals.

In the above configuration, the timing controller may be configured to compensate for and provide the display data. In addition, the timing controller and the driver integrated circuit may each be implemented as chips or in one chip. Accordingly, the present disclosure may be implemented in the timing controller or a complex integrated circuit including the timing controller.

Figure 1:
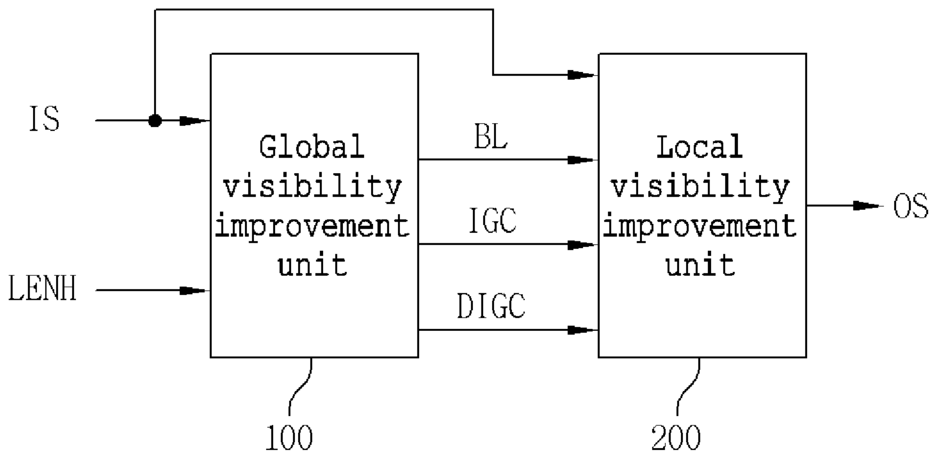
FIG. 1 is a block diagram illustrating a display device according to an embodiment of the present disclosure.

The display device of the present disclosure may include parts for improving visibility as illustrated in FIG. 1. Referring to FIG. 1, the display device may be implemented to include a global visibility improvement unit 100 and a local visibility improvement unit 200 to improve visibility of an image.

The global visibility improvement unit 100 and the local visibility improvement unit 200 described above are examples of some components for improving visibility of a display device. The display device may further include various components that receive display data for an image, compensate for the display data, and transmit the display data.

The global visibility improvement unit 100 and the local visibility improvement unit 200 may be implemented using a logic circuit, implemented as a microprocessor process through programming, or implemented by a combination of processes of a logic circuit and a microprocessor processor (collectively "processing circuitry").

In some embodiments, the display device may comprise: processing circuitry (PC), which may include one or more processors (e.g., one or more general purpose microprocessors and/or one or more other processors, such as an application specific integrated circuit (ASIC), field-programmable gate arrays (FPGAs), and the like); and a local storage unit (a.k.a., "data storage system"), which may include one or more non-volatile storage devices and/or one or more volatile storage devices. In embodiments where PC includes a programmable processor, a computer program product may be provided. CPP includes a computer readable medium (CRM) storing a computer program (CP) comprising computer readable instructions (CRI). CRM may be a non-transitory computer readable medium, such as, magnetic media (e.g., a hard disk), optical media, memory devices (e.g., random access memory, flash memory), and the like. In some embodiments, the CRI of computer program is configured such that when executed by PC, the CRI causes the display device to perform steps described herein (e.g., steps described herein with reference to the flow charts). In other embodiments, the display device may be configured to perform steps described herein without the need for code. That is, for example, PC may consist merely of one or more ASICs. Hence, the features of the embodiments described herein may be implemented in hardware and/or software.

In general, an illuminance sensor (not illustrated) may be configured in a display system (not illustrated) to improve visibility, and may be configured to sense illuminance around a display panel (not illustrated) and provide an illuminance signal LENH corresponding to the illuminance. In an embodiment of the present disclosure, the illuminance signal LENH may be understood as digital information representing an analog sensing level.

The global visibility improvement unit 100 may be configured to receive input frame data IS and the illuminance signal LENH, and output image brightness level information BL, global compensation information IGC, and visibility reduction modeling information DIGC.

More specifically, the global visibility improvement unit 100 may be configured to select class information CL corresponding to the content represented in the image using the input frame data IS, generate image brightness level information BL of the input frame data IS, and generate global compensation information IGC by performing global compensation using the data IS, the class information CL, the image brightness level information BL, and the illuminance signal LENH for the image.

In addition, the global visibility improvement unit 100 may be configured to generate the visibility reduction modeling information DIGC required for compensation of a preset high luminance area and a preset low luminance area of the global compensation information IGC, and output the visibility reduction modeling information DIGC.

The local visibility improvement unit 200 may be configured to receive the input frame data IS, the image brightness level information BL, the global compensation information IGC, and the visibility reduction modeling information DIGC, and output frame data OS.

More specifically, the local visibility improvement unit 200 may be configured to generate local compensation information ILC by performing local compensation on the input frame data IS, and generate the output frame data OS obtained by converting the input frame data IS by blending the global compensation information IGC and the local compensation information ILC.

In addition, the local visibility improvement unit 200 may be configured to generate a local contrast map MLC in which a proportional relationship between the visibility reduction modeling information DIGC and the input frame data IS is normalized, and generate a local contrast weighted map MLCW obtained by applying a weight corresponding to the image brightness level information BL to the local contrast map MLC, and adjust the blending for generating the output frame data OS using the local contrast weighted map MLCW.

Figure 2:
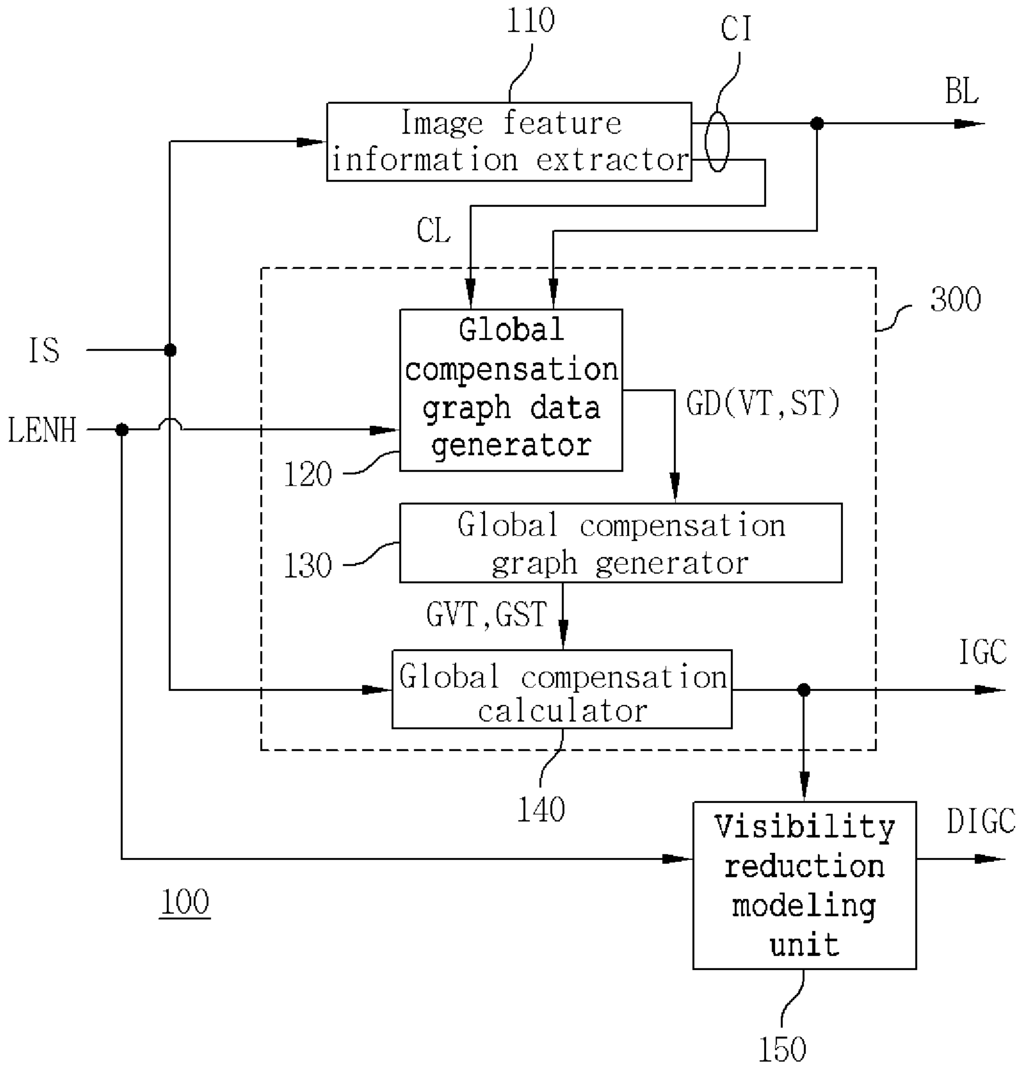
FIG. 2 is a detailed block diagram of a global visibility improvement unit of FIG. 1, according to some embodiments.

Among the components of the embodiment of FIG. 1 described above, the global visibility improvement unit 100 may be implemented as illustrated in FIG. 2.

The global visibility improvement unit 100 may include an image feature information extractor 110 and a global visibility compensation unit 300.

Among them, the image feature information extractor 110 may be configured to select class information CL corresponding to the content represented in the image using the input frame data IS, and generate image brightness level information BL of the input frame data IS. In this case, content information CI may include the class information CL corresponding to the content of the input frame data IS and the image brightness level information BL of the input frame data IS.

Illustratively, objects may be mainly displayed in content of images, landscapes may be mainly displayed, or graphics may be mainly displayed. The images may be classified as those mainly displayed in content, and may be exemplarily classified into object images, landscape images, and graphic images, respectively. The content of the image displayed in this way may be understood as the content of the input frame data IS. Therefore, the class information CL may be understood as having values for distinguishing content such as "object image, landscape image, graphic image" included in the input frame data IS. The classification process is described in further detail below. In addition, the image brightness may be classified into a plurality of levels, and may be exemplarily classified as "very dark, . . . medium brightness, . . . very bright". Therefore, the image brightness level information BL may be understood as having a value for distinguishing an image brightness level.

The image feature information extractor 110 described above may be further described with reference to FIG. 3.

The image feature information extractor 110 may include a class classifier 112 and an average brightness calculator 114.

The class classifier 112 may be configured to store class information on previously classified content and select class information CL corresponding to the content of the input frame data IS.

That is, the class classifier 112 may provide the class information CL corresponding to the content of the image, and the class information CL may have a value corresponding to the content. In some embodiments, a classifier may be used that extracts one or more features from the image, and classifies the image based on the one or more extracted features according to techniques appreciate in the art.

Figure 4:
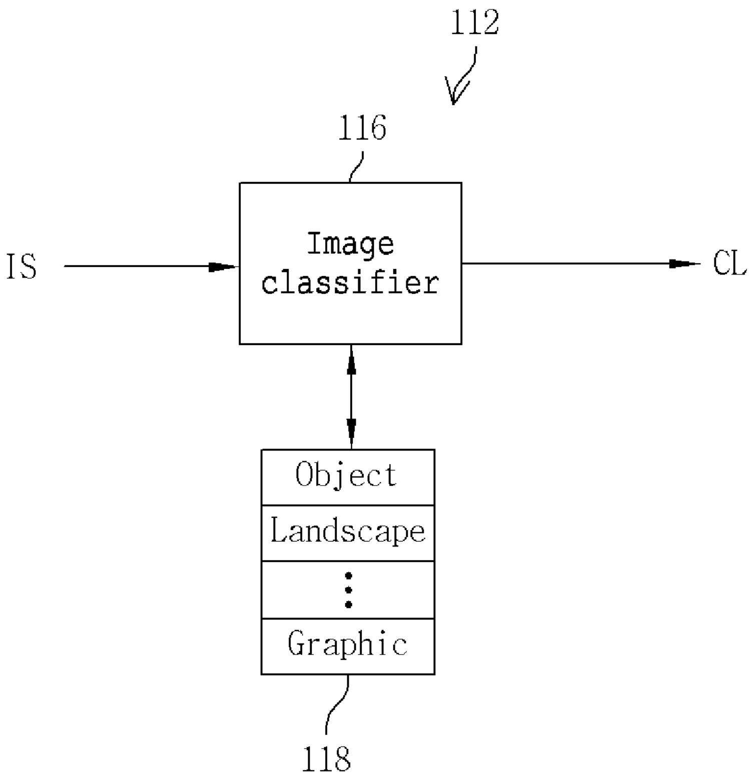
FIG. 4 is a detailed block diagram of a class classifier of FIG. 3, according to some embodiments.

More specifically, the class classifier 112 may include an image classifier 116 and a lookup table 118 as illustrated in FIG. 4.

The image classifier 116 may be configured to classify the content of the input frame data IS, select class information corresponding to the input frame data IS among the class information stored in the lookup table 118, and output the selected class information CL.

The lookup table 118 may be configured to store the class information on the previously classified content and provide the class information CL corresponding to the content selected by the image classifier 116.

Figure 3:
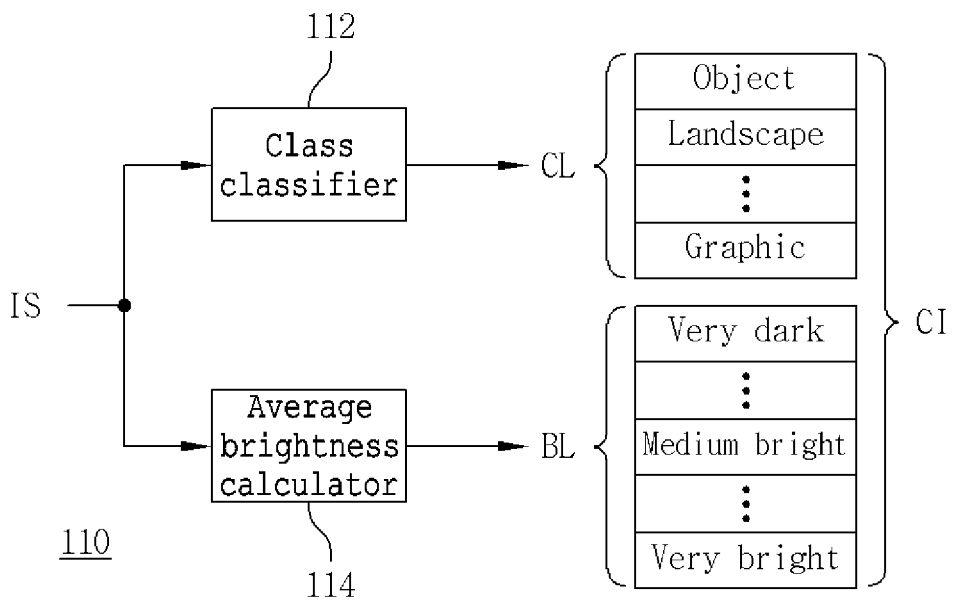
FIG. 3 is a detailed block diagram of an image feature information extractor of FIG. 2, according to some embodiments.

In addition, the average brightness calculator 114 of the image feature information extractor 110 of FIG. 3 may be configured to calculate the average brightness of the input frame data IS and generate the image brightness level information BL as a calculated result. The image brightness level information BL may be understood as having a value corresponding to the average brightness of the input frame data IS.

Meanwhile, in the global visibility improvement unit 100, the global visibility compensation unit 300 is configured to generate global compensation information IGC by performing global compensation using the input frame data IS, the content information CI, and the illuminance signal LENH for the image.

The global visibility compensation unit 300 may include a global compensation graph data generator 120, a global compensation graph generator 130, and a global compensation calculator 140.

The global compensation graph data generator 120 is configured to store a plurality of global compensation graph data, and select and provide global compensation graph data corresponding to the illuminance signal LENH, the class information CL, and the image brightness level information BL.

Figure 5:
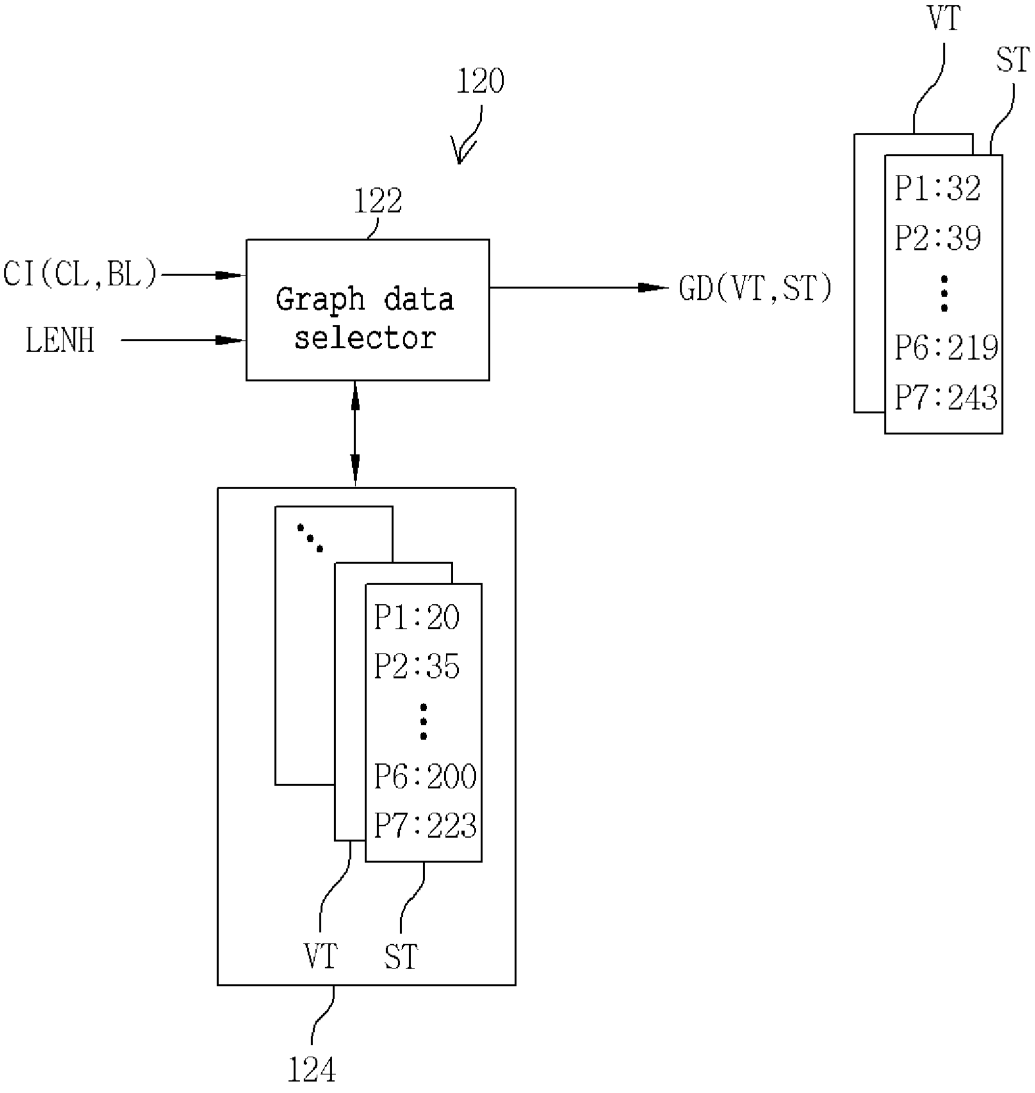
FIG. 5 is a detailed block diagram of a global compensation graph data generator of FIG. 2, according to some embodiments.

More specifically, the global compensation graph data generator 120 includes a lookup table 124 as illustrated in FIG. 5, and the lookup table 124 may store global compensation graph data that includes a brightness value table and a saturation table corresponding to various illuminance signals LENH, various types of class information CL, and various types of image brightness level information BL.

In addition, the global compensation graph data generator 120 includes a graph data selector 122 as illustrated in FIG. 5, and the graph data selector 122 may select and provide global compensation graph data GD corresponding to the illuminance signal LENH and the class information CL and the image brightness level information BL provided from the image feature information extractor 110.

In this case, the global compensation graph data GD may include a brightness value table (VT) and a saturation table (ST).

Illustratively, the brightness value table VT and the saturation table ST may be set to have values corresponding to a plurality of preset levels among luminance ranges of an RGB domain. Illustratively, the brightness value table VT and the saturation table ST may each have values corresponding to a plurality of levels P1 to P7.

Figure 6:
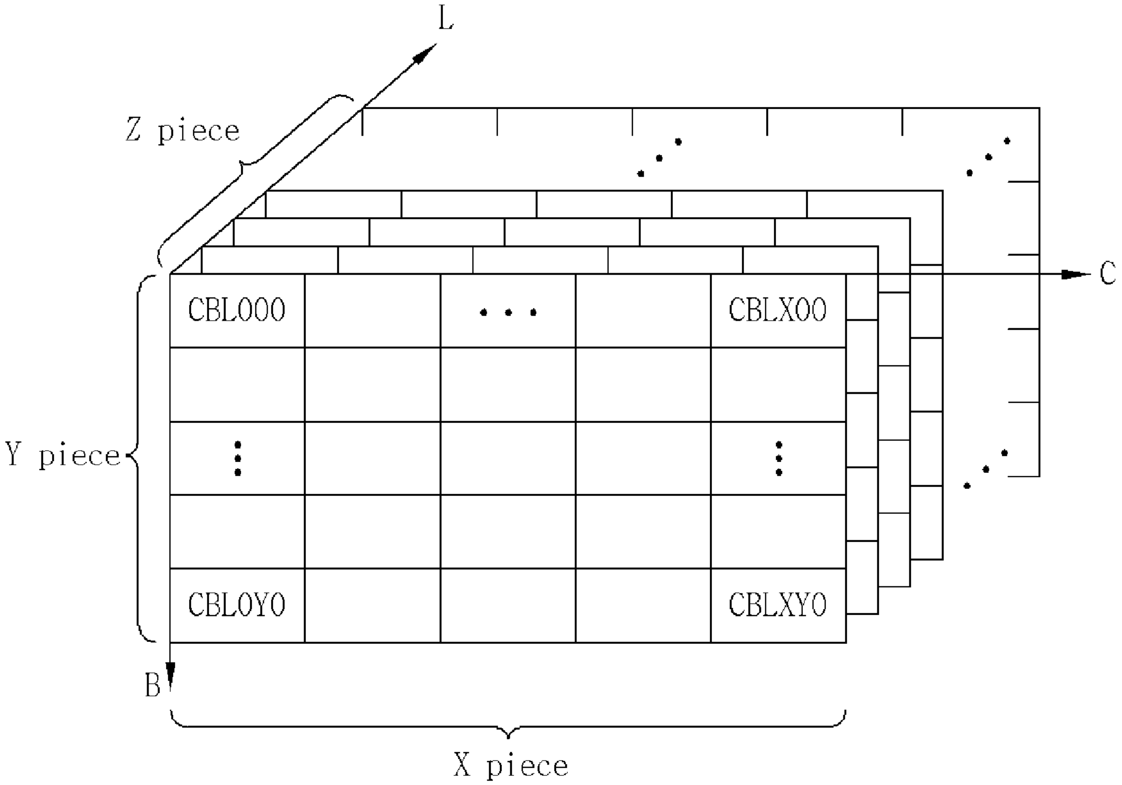
FIG. 6 is a three-dimensional graph illustrating a test frame set of FIG. 5, according to some embodiments.

As illustrated in FIG. 6, the lookup table 124 may be configured as a three-dimensional table according to the illuminance signal LENH and the class information CL and image brightness level information BL included in the content information CI. A C axis corresponds to the class information CL, a B axis corresponds to the image brightness level information BL, and an L axis corresponds to the illuminance signal LENH.

The lookup table 124 may store global compensation graph data CBL that corresponds to a plurality of class information CL, a plurality of image brightness level information BL, and a plurality of illuminance signals LENH. The global compensation graph data CBL of the lookup table 124 may be expressed as CBL000 to CBLXYZ corresponding to coordinates of the lookup table. One of the global compensation graph data CBL may be selected by the graph data selector 122 and provided as the global compensation graph data GD.

As described above, when the illuminance signal LENH, the class information CL, and the image brightness level information BL are received, the global compensation graph data generator 120 may select and provide the corresponding global compensation graph data GD.

Meanwhile, in the global visibility improvement unit 100, the global compensation graph generator 130 may receive the global compensation graph data GD including the brightness value table VT and the saturation table ST, and generate a brightness value global compensation graph GVT corresponding to the brightness value table VT and a saturation global compensation graph GST corresponding to the saturation table ST.

Figure 7:
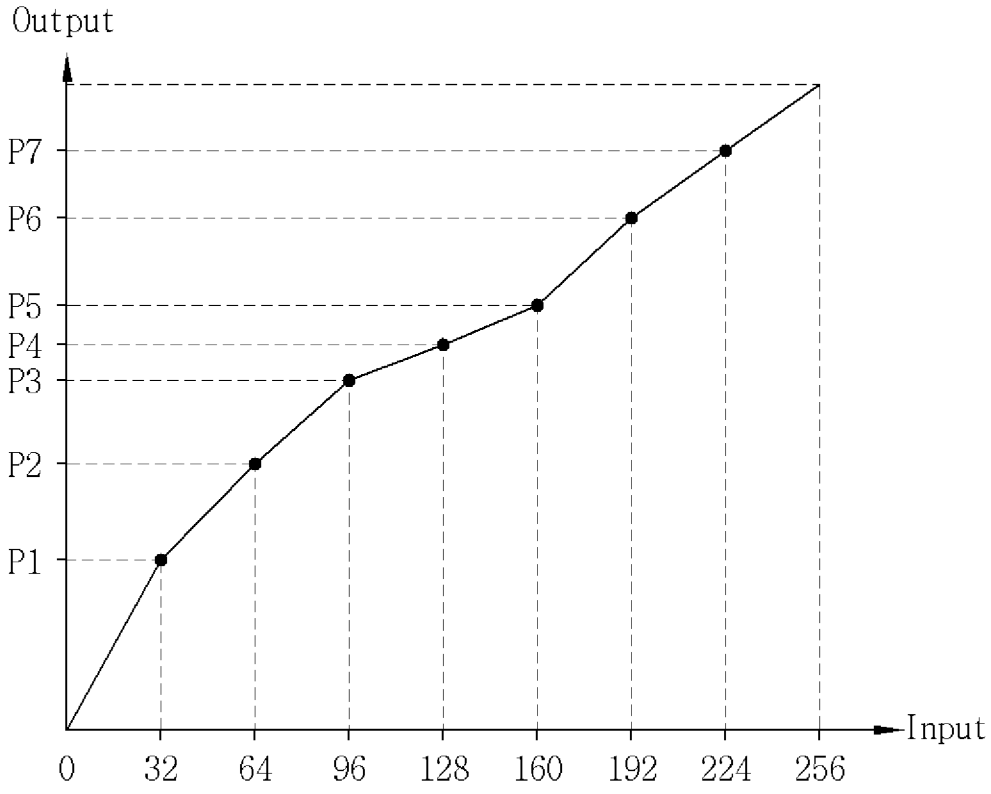
FIG. 7 illustrates a global compensation graph, according to some embodiments.

The brightness value global compensation graph GVT and the saturation global compensation graph GST may be understood as the global compensation graph. The global compensation graph may be understood with reference to FIG. 7. The brightness value global compensation graph GVT may define, as illustrated in FIG. 7, a correlation between a luminance level of an input and the plurality of levels P1 to P7 of the brightness value table VT corresponding to an output. The saturation global compensation graph GST may define, as illustrated in FIG. 7, a correlation between the luminance level of the input and the plurality of levels P1 to P7 of the saturation table ST corresponding to the output.

Meanwhile, in the global visibility improvement unit 100, the global compensation calculator 140 may be configured to output global compensation information IGC obtained by calculating the input frame data IS using the global compensation graph provided from the global compensation graph generator 130.

More specifically, the global compensation calculator 140 may be configured to convert first brightness of the input frame data IS into second brightness using the brightness value global compensation graph GVT, convert first saturation of the input frame data IS into second saturation using the saturation global compensation graph, and output the global compensation information IGC having values corresponding to the second brightness value and the second saturation.

Figure 8:
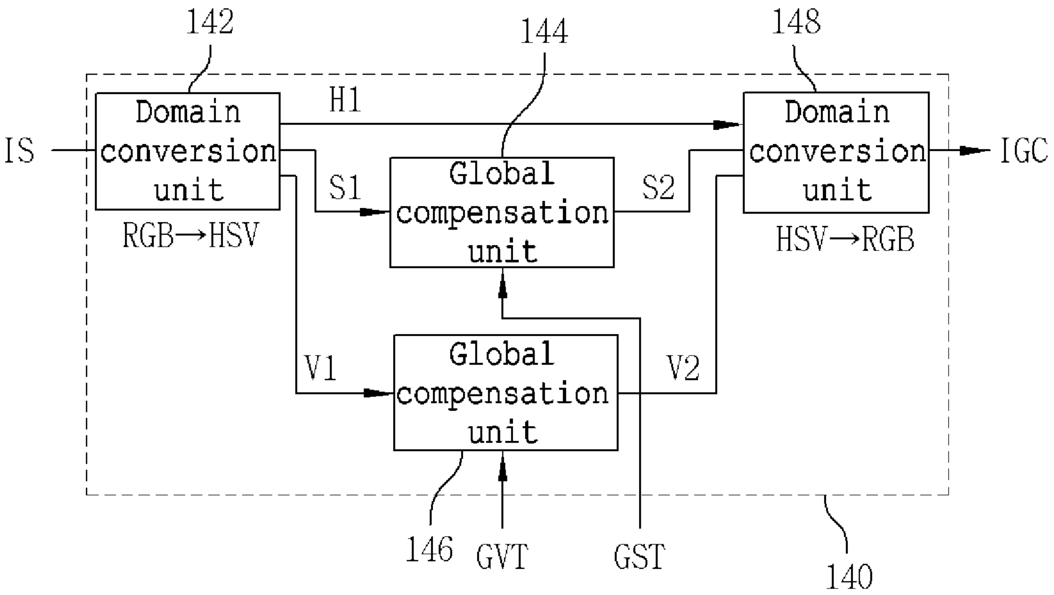
FIG. 8 is a detailed block diagram of a global compensation calculator of FIG. 2, according to some embodiments.

The global compensation calculator 140 described above may be described with reference to FIG. 8.

The global compensation calculator 140 may include domain conversion units 142 and 148 and global compensation units 144 and 146.

The domain conversion unit 142 may be configured to convert the input frame data IS of the RGB domain into an HSV domain, and output hue H1, first brightness value V1, and first saturation S1 of the input frame data IS.

The global compensation unit 144 may be configured to output second saturation S2 obtained by compensating for the first saturation S1 using the saturation global compensation graph GST.

The global compensation unit 146 may be configured to output second brightness value V2 obtained by compensating for the first brightness value V1 using the brightness value global compensation graph GVT.

The domain conversion unit 148 may be configured to convert data of the HSV domain including the hue H1, the second saturation S2, and the second brightness value V2 into the RGB domain, and output the global compensation information IGC of the RGB domain.

When the global compensation is performed on a luminance component of the RGB domain, color distortion may occur. In order to prevent the distortion described above, the global compensation calculator 140 of the present disclosure may be configured to change the input frame data IS to the HSV domain and compensate for the saturation and brightness value of the HSV domain.

Figure 9:
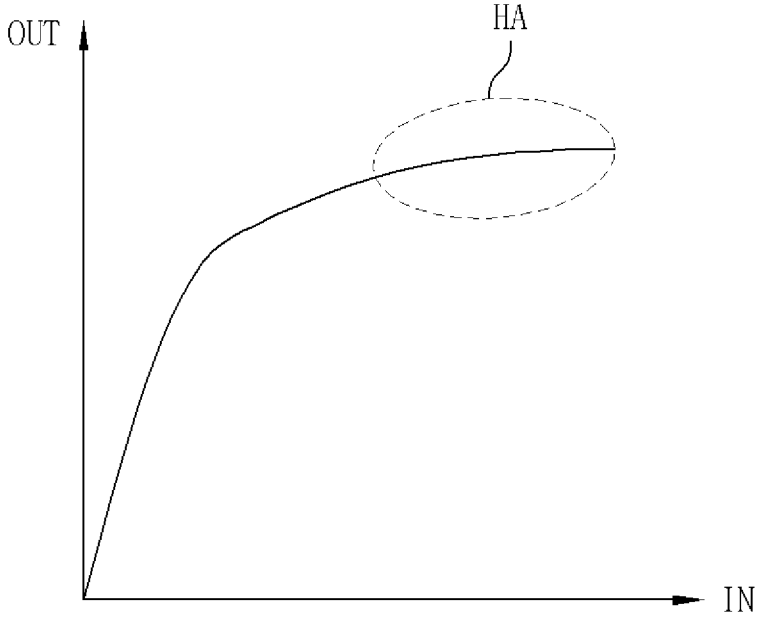
FIG. 9 is a graph illustrating a distribution of pixel values by global compensation when the image brightness level information is a dark series, according to some embodiments.

Meanwhile, in the case of an image in which the image brightness level information is distributed in a dark series, most pixel values of the image may be distributed in low gradation. In the case of performing global compensation on an image having image brightness level information of the dark series, the global compensation calculator 140 uses the brightness value global compensation graph GVT and the saturation global compensation graph GST which have characteristics of improving visibility by increasing the brightness of the entire image. Therefore, as a result of the global compensation, a contrast of a high gradation area HA of the global compensation information IGC may be lowered as illustrated in FIG. 9.

Figure 10:
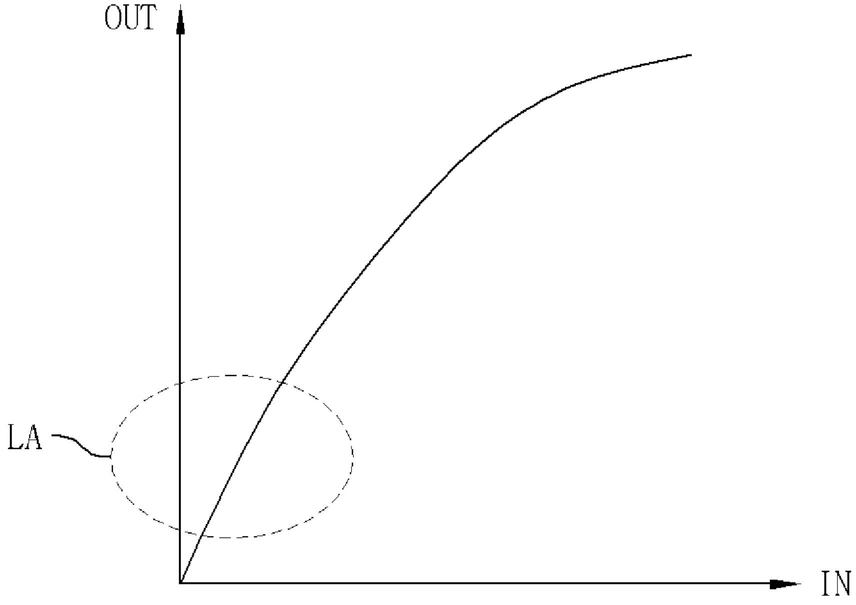
FIG. 10 is a graph illustrating a distribution of pixel values by global compensation when the image brightness level information is a dark series, according to some embodiments.

Conversely, in the case of an image in which the image brightness level information is distributed in a bright series, most pixel values of the image may be distributed in low gradation. In the case of performing global compensation on an image having image brightness level information of the bright series, the global compensation calculator 140 uses the brightness value global compensation graph GVT and the saturation global compensation graph GST which have characteristics of improving visibility by increasing the brightness of the entire image. Therefore, as a result of the global compensation, a contrast of a low gradation area LA of the global compensation information IGC may be lowered as illustrated in FIG. 10.

Therefore, the global compensation information IGC needs to improve the visibility of the high gradation area and the low gradation area. The visibility of the high gradation area and the low gradation area may be performed in local compensation, and visibility modeling information for use in the local compensation needs to be provided in the global compensation.

To this end, according to an embodiment of the present disclosure, the global visibility improvement unit 100 may include a visibility reduction modeling unit 150, and the visibility reduction modeling unit 150 is configured to receive the illuminance signal LENH and the global compensation information IGC, generate the visibility reduction modeling information DIGC required for compensation of a preset high luminance area and a preset low luminance area of the global compensation information IGC, and output the visibility reduction modeling information DIGC.

In this case, the visibility reduction modeling information DIGC may be understood as including first modeling information for compensation in proportion to a degree of contrast deterioration of the high gradation area HA and second modeling information for compensation in proportion to a degree of contrast deterioration of the low gradation area LA, and the first modeling information and the second modeling information may be set to have a value proportional to the illuminance signal LENH.

Figure 11:
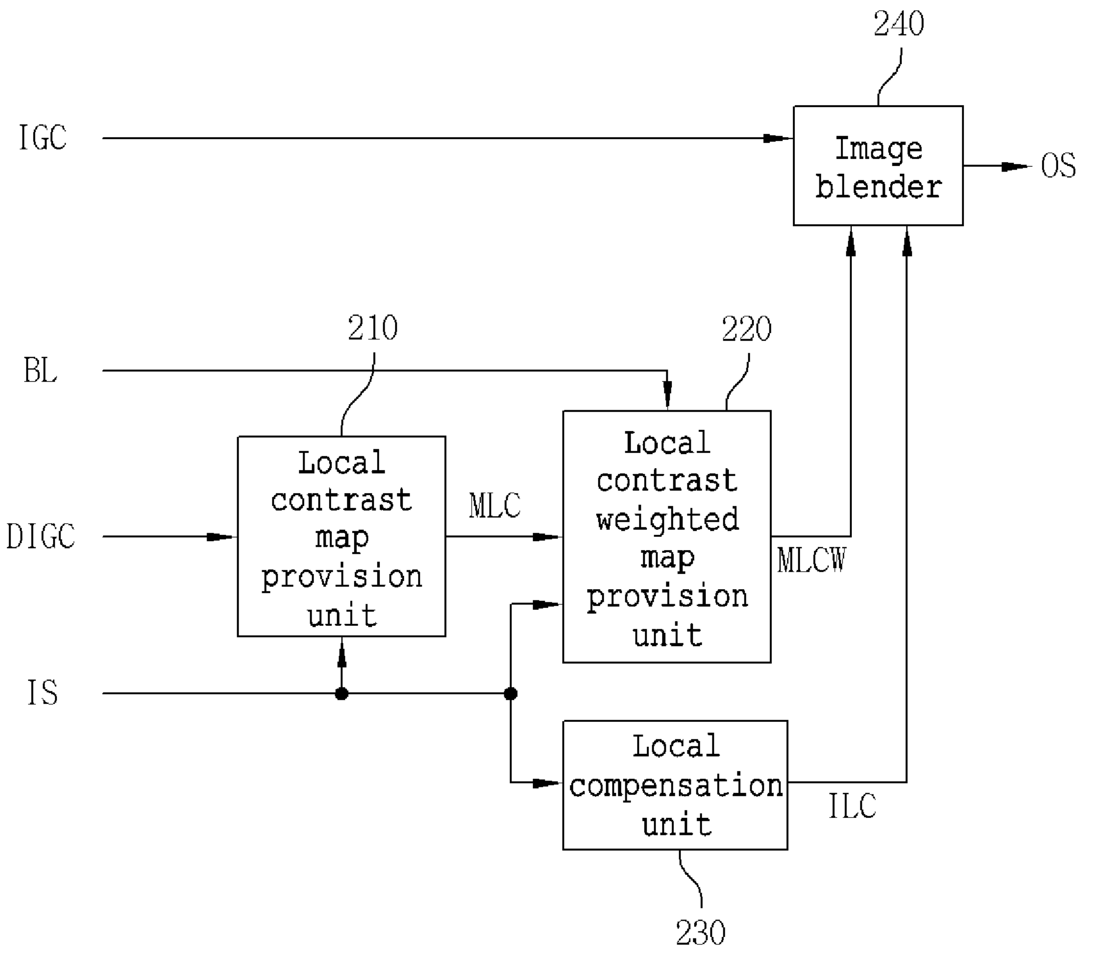
FIG. 11 is a detailed block diagram of a local visibility improvement unit of FIG. 1, according to some embodiments.

Meanwhile, among the components of the embodiment of FIG. 1 described above, the local visibility improvement unit 200 may be implemented as illustrated in FIG. 11.

The local visibility improvement unit 200 may include a local contrast map provision unit 210, a local contrast weighted map provision unit 220, a local compensation unit 230, and an image blender 240.

In the above configuration, the local compensation unit 230 performs the local compensation on the input frame data IS to generate the local compensation information ILC.

When not considering reflecting system modeling information, the image blender 240 may generate the output frame data OS obtained by converting the input frame data IS by blending the global compensation information IGC and the local compensation information ILC. In this case, it may be exemplified that the blending of the image blender 240 sums the global compensation information IGC and the local compensation information ILC.

As described above, the local compensation unit 230 may perform the preset local compensation on the input frame data IS, and the local compensation may be implemented by various methods.

Illustratively, for the local compensation, each pixel may be defined as a center pixel, and a preset unit area including the center pixel may be defined for each pixel of an image. Average luminance of a unit area may be calculated for the local compensation, and when the average luminance of the unit area is high or low luminance, the luminance of the center pixel may be changed by applying a preset proportional expression. The luminance calculated by the proportional expression may be used as the above local compensation information ILC.

The above local compensation is only an example for understanding, and in the present disclosure, the local compensation unit 230 may perform various local compensations that may be designed by a manufacturer, and provide the local compensation information corresponding to the result.

Meanwhile, in the local visibility improvement unit 200, the local contrast map provision unit 210 and the local contrast weighted map provision unit 220 may be understood as being configured to improve the visibility of the high gradation area and low gradation area of the global compensation information IGC.

To this end, the local contrast map provision unit 210 may be configured to provide a local contrast map MLC in which a proportional relationship between the visibility reduction modeling information DIGC and the input frame data IS is normalized. In this case, the visibility reduction modeling information DIGC may be understood as information necessary for compensation of a preset high luminance area and a preset low luminance area of the global compensation information IGC.

Figure 12:
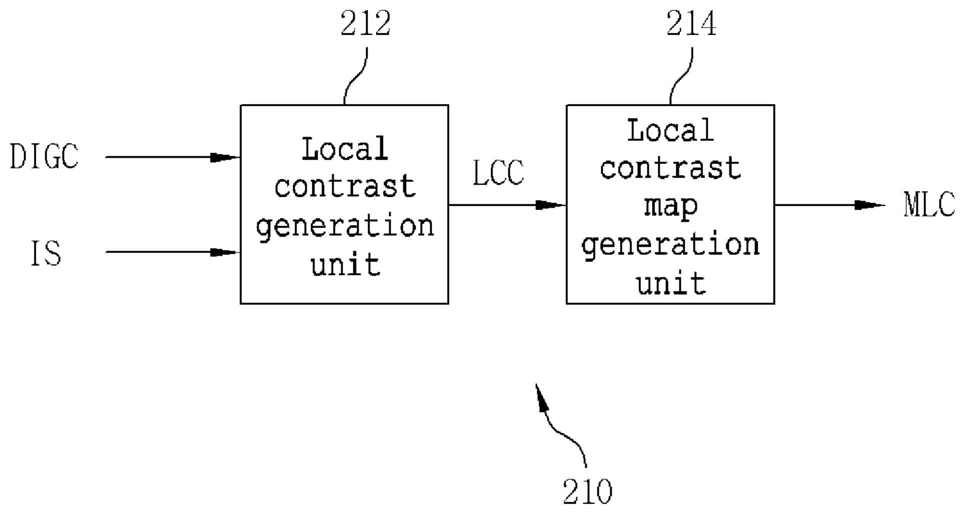
FIG. 12 is a detailed block diagram of a local contrast map provision unit of FIG. 11, according to some embodiments.

It may be exemplified that the local contrast map provision unit 210 may include a local contrast generation unit 212 and a local contrast map generation unit 214 as illustrated in FIG. 12.

Figure 13:
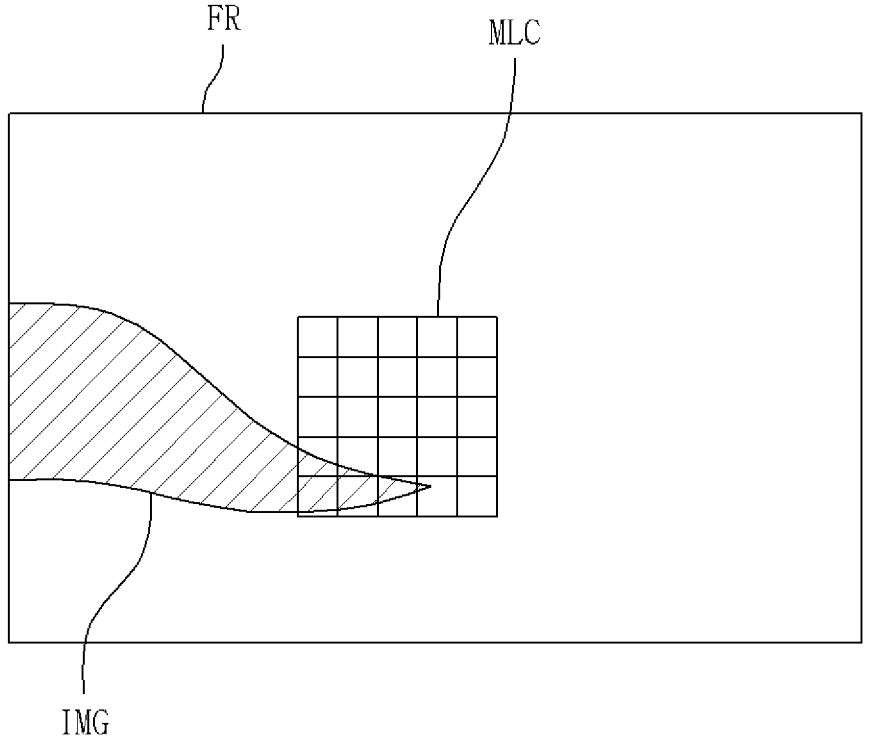
FIG. 13 is a diagram for describing a local contrast weighted map, according to some embodiments.

Here, as illustrated in FIG. 13, the local contrast generation unit 212 may be configured to obtain a local contrast value LCC obtained by normalizing the proportional relationship between the visibility reduction modeling information DIGC and the input frame data IS with respect to a local area MLC set in an image FR. In FIG. 13, the IMG may be understood as indicating content included in the image FR. Also, the normalization may be understood as ensuring that the proportional value of the visibility reduction modeling information DIGC and the input frame data IS is distributed within a preset range.

Also, the local contrast map generation unit 214 may be configured to generate the local contrast map MLC in which the local contrast value LCC is mapped to correspond to the input frame data IS.

In addition, the local contrast weighted map provision unit 220 may be configured to receive the image brightness level information BL included in the content information CI of the global visibility improvement unit 100, and provide a local contrast weighted map MLCW corresponding to the input frame data IS by applying a weight corresponding to the image brightness level information BL to the local contrast map MLC.

More specifically, the local contrast weighted map provision unit 220 may generate the local contrast weighted map MLCW by multiplying the local contrast map MLC by a weight. Here, the weight may be set by the weight calculation formula, that is, "$\alpha \times IS + (1-\alpha) \times (1-IS)$," where a denotes the brightness value and IS denotes the input frame data.

Figure 14:
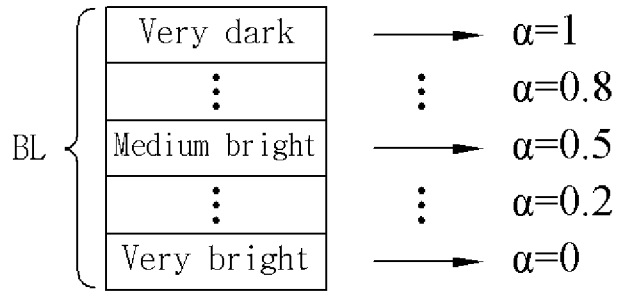
FIG. 14 is a table illustrating weights applied to the local contrast weighted map, according to some embodiments.

As illustrated in FIG. 14, the brighter the brightness value is set to be smaller, and the darker the brightness value is set to be larger, with respect to the preset range of the image brightness level information BL.

As described above, when the local contrast weighted map MLCW is obtained to improve the visibility of the high gradation area and low gradation area of the global compensation information IGC in the local contrast map provision unit 210 and the local contrast weighted map provision unit 220, the image blender 240 may generate the output frame data OS obtained by converting the input frame data IS by the blending calculation formula.

Figure 15:
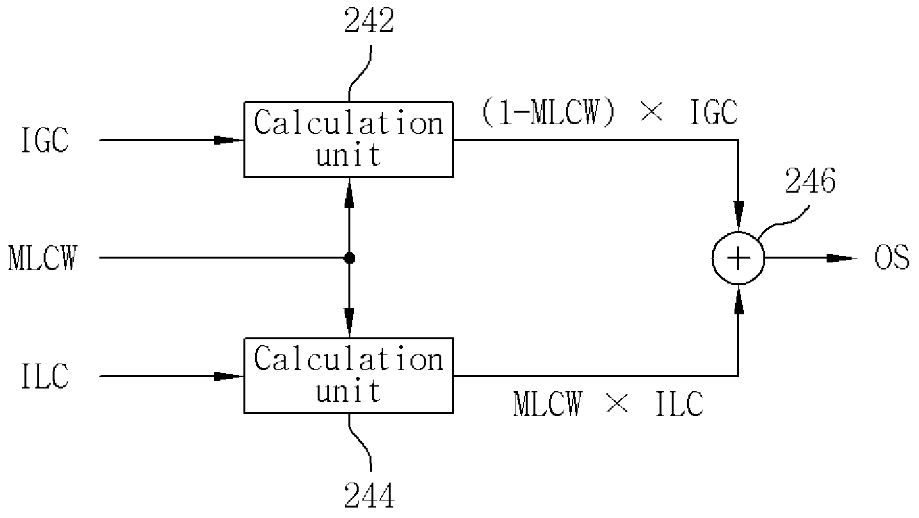
FIG. 15 is a detailed block diagram of an image blender of FIG. 11, according to some embodiments.

The image blender 240 may be configured as illustrated in FIG. 15 to process the blending calculation formula. That is, the image blender 240 may be understood as including calculation units 242 and 244 and a summing unit 246.

The blending calculation formula described above may be defined as "local compensation information ILC×local contrast weighted map MLCW+global compensation information IGC×(1-local contrast weighted map MLCW)."

The calculation unit 244 is configured to receive the local compensation information ILC and the local contrast weighted map MLCW and output the "local compensation information ILC×local contrast weighted map MLCW" by internal calculation.

In addition, the calculation unit 242 is configured to receive the global compensation information IGC and the local contrast weighted map MLCW and output the "global compensation information IGC×(1-local contrast weighted map MLCW" by the internal calculation.

Also, the summing unit 246 may generate the output frame data OS by summing the outputs of the calculation units 242 and 244.

As a result, the local visibility improvement unit 200 may provide the output frame data OS having the improved visibility of the high gradation area and the low gradation area of the global compensation information IGC.

An embodiment of the present disclosure may select the class information CL corresponding to content represented in an image using the input frame data IS for the image and generate the image brightness level information BL.

Also, according to the embodiment of the present disclosure, the global compensation information may be generated by performing the global compensation using the input frame data IS, the class information CL, the image brightness level information BL, and the illuminance signal LENH for the image.

An embodiment of the present disclosure may select the global compensation graph data GD including the saturation table ST and the brightness value table VT corresponding to the class information CL, the image brightness level information BL, and the illuminance signal LENH for the global compensation described above, generate the global compensation graph including the saturation global compensation graph GST and the brightness value global compensation graph GVT using the global compensation graph data GD, and output the global compensation information IGC obtained by the input frame IS using the global compensation graph.

The present disclosure may improve visibility adaptively to content displayed in an image. Therefore, there is an advantage in solving the visibility problem caused by complex elements.

Also, according to the embodiments of the present disclosure, it is possible to provide optimal visibility corresponding to content of an image and ambient illumination, and provide improved visibility according to global compensation and local compensation by reflecting content characteristics to both the global compensation and local compensation.

Further, various embodiments are directed to a display device capable of improving visibility according to local compensation by reflecting a result of global compensation adaptive to content displayed in an image to the local compensation, and a visibility improvement method of an image therefor.

In addition, according to the embodiments of the present disclosure, it is possible to provide a high-quality image by improving visibility as described above.

What is claimed is:

1. A display device, comprising:

processing circuitry; and a memory coupled to the processing circuitry, wherein the processing circuitry is configured to:

obtain input frame data corresponding to an image;

classify content represented in the image as at least one first class of a plurality of classes;

obtain image brightness level information of the input frame data;

obtain an illuminance signal for the image;

generate global compensation information based on the input frame data, the at least one first class, the image brightness level information, and the illuminance signal;

identify a plurality of unit areas of the image;

generate local compensation information for each unit area of the plurality of unit areas;

generate output frame data based on blending the global compensation information and the local compensation information; and output the generated output frame data to a display, wherein the processing circuitry is further configured to:

generate visibility reduction modeling information for compensation of a preset high luminance area and a preset low luminance area of the global compensation information; and output the visibility reduction modeling information.

2. The display device according to claim 1, wherein the processing circuitry is further configured to:

generate the image brightness level information of the input frame data.

3. The display device according to claim 1, wherein the processing circuitry is further configured to:

store class information of the plurality of classes on pre-classified content; and classify the content represented in the image as the at least one first class based on the stored class information.

4. The display device according to claim 1, wherein the processing circuitry is further configured to:

calculate average brightness of the input frame data, wherein the obtained image brightness level information is the calculated result.

5. The display device according to claim 1, wherein the processing circuitry is further configured to:

store a plurality of pieces of global compensation graph data;

select one or more pieces of global compensation graph data corresponding to the illuminance signal, the at least one first class, and the image brightness level information;

generate a global compensation graph corresponding to the selected one or more pieces of global compensation graph data; and output the global compensation information by calculating the input frame data using the global compensation graph.

6. The display device according to claim 5, wherein the global compensation graph data comprises a brightness value table and a saturation table, and wherein the brightness value table and the saturation table are set to have values corresponding to a plurality of preset levels among luminance ranges of the input frame data.

7. The display device according to claim 6, wherein the global compensation graph corresponds to the brightness value table and the saturation table, and wherein the processing circuitry is further configured to:

convert a first brightness value and a first saturation of the input frame data into a second brightness value and a second saturation corresponding to the brightness value table and the saturation table; and output the global compensation information having values corresponding to the second brightness value and the second saturation.

8. The display device according to claim 1, wherein the processing circuitry is further configured to:

generate the local compensation information by performing the local compensation on the input frame data; and generate the output frame data by blending the global compensation information and the local compensation information.

9. The display device according to claim 8, wherein the processing circuitry is further configured to:

obtain a local contrast map in which a proportional relationship between visibility reduction modeling information and the input frame data is normalized;

obtain a local contrast weighted map, wherein the local contrast weighted map is obtained by applying a weight corresponding to the image brightness level information to the local contrast map; and compensate the preset high luminance area and the preset low luminance area of the global compensation information based on the local contrast weighted map.

10. The display device according to claim 9, wherein the weight is set by a weight calculation formula such that a larger brightness value is set to be smaller and a lower brightness value is set to be larger with respect to a preset range of the image brightness level information.

11. The display device according to claim 9, wherein the processing circuitry is further configured to:

convert the input frame data according to a blending calculation formula, wherein the blending calculation formula is based on the local compensation information, the local contrast weighted map, and the global compensation information.

12. A method for improving visibility of an image for a display device, the method comprising:

obtaining input frame data corresponding to an image;

classifying content represented in the image as at least one first class of a plurality of classes;

calculating image brightness level informative of the input frame data;

obtaining an illuminance signal for the image;

generating global compensation information based on the input frame data, the at least one first class, the image brightness level information, and the illuminance signal;

generating output frame data based on the global compensation information; and outputting the generated output frame data to a display, wherein the method further comprises:

identifying a plurality of unit areas of the image; and generating local compensation information for each unit area of the plurality of unit areas, wherein the generating the output frame data comprises blending the local compensation information and the global compensation information, and wherein the method further comprises:

generating visibility reduction modeling information for compensating for a preset high luminance area and a preset low luminance area of the global compensation information; and outputting the visibility reduction modeling information, wherein the generating the output frame data comprises controlling the blending of the local compensation information and the global compensation information corresponding to the visibility reduction modeling information and the image brightness level information.

13. The method according to claim 12, further comprising:

generating the local compensation information by performing the local compensation on the input frame data; and generating the output frame data by blending the global compensation information and the local compensation information.

14. The method according to claim 13, further comprising:

obtaining a local contrast map in which a proportional relationship between visibility reduction modeling information and the input frame data is normalized;

obtaining a local contrast weighted map, wherein the local contrast weighted map is obtained by applying a weight corresponding to the image brightness level information to the local contrast map; and compensating the preset high luminance area and the preset low luminance area of the global compensation information based on the local contrast weighted map.

15. The method according to claim 14, wherein the weight is set by a weight calculation formula such that a larger brightness value is set to be smaller and a lower brightness value is set to be larger with respect to a preset range of the image brightness level information.

16. The method according to claim 14, further comprising:

converting the input frame data according to a blending calculation formula, wherein the blending calculation formula is based on the local compensation information, the local contrast weighted map, and the global compensation information.

17. A computer program product comprising a non-transitory computer readable medium storing computer readable instructions, wherein, when executed by processing circuitry, the computer readable instructions cause the processing circuitry to:

obtain input frame data corresponding to an image;

classify content represented in the image as at least one first class of a plurality of classes;

obtain image brightness level information of the input frame data;

obtain an illuminance signal for the image;

generate global compensation information based on the input frame data, the at least one first class, the image brightness level information, and the illuminance signal;

identify a plurality of unit areas of the image;

generate local compensation information for each unit area of the plurality of unit areas;

generate output frame data based on blending the global compensation information and the local compensation information;

output the generated output frame data to a display, generate visibility reduction modeling information for compensation of a preset high luminance area and a preset low luminance area of the global compensation information; and output the visibility reduction modeling information.

* * * * *